US007121591B2

(12) United States Patent
Foti

(10) Patent No.: US 7,121,591 B2
(45) Date of Patent: Oct. 17, 2006

(54) FLEXIBLE METAL HOSE ASSEMBLY AND METHOD OF MAKING THE SAME

(75) Inventor: Santo Foti, Orange Village, OH (US)

(73) Assignee: Hose Master, Inc., Cleveland, OH (US)

( * ) Notice: Subject to any disclaimer, the term of this patent is extended or adjusted under 35 U.S.C. 154(b) by 131 days.

(21) Appl. No.: 10/610,434

(22) Filed: Jun. 30, 2003

(65) Prior Publication Data

US 2004/0089360 A1    May 13, 2004

Related U.S. Application Data

(60) Provisional application No. 60/424,865, filed on Nov. 8, 2002.

(51) Int. Cl.
*F16L 33/00* (2006.01)
(52) U.S. Cl. ............... 285/258; 285/222.5; 29/282
(58) Field of Classification Search ............ 285/148.3, 285/258, 371, 222.5, 222.4; 29/890.14, 282
See application file for complete search history.

(56) References Cited

U.S. PATENT DOCUMENTS

| 1,365,306 | A | * | 1/1921 | Dickinson | 285/222.2 |
| 1,699,911 | A | * | 1/1929 | Palmer | 285/114 |
| 1,915,041 | A | * | 6/1933 | Wallace | 285/258 |
| 1,974,383 | A | * | 9/1934 | Wallace | 285/258 |
| 2,228,018 | A | * | 1/1941 | Scholtes | 285/222.4 |
| 2,402,497 | A | * | 6/1946 | Johnson | 138/135 |
| 3,251,612 | A | * | 5/1966 | Webbe | 285/47 |
| 3,442,297 | A | * | 5/1969 | Wesesku | 138/122 |
| 3,964,772 | A | * | 6/1976 | Cox, Jr. | 285/39 |
| 3,992,044 | A | * | 11/1976 | Muslin | 285/92 |
| 4,197,728 | A |   | 4/1980 | McGowen | |
| 4,486,484 | A |   | 12/1984 | Schafer | |
| 5,158,814 | A |   | 10/1992 | Foti | |
| 6,016,847 | A | * | 1/2000 | Jung et al. | 138/131 |
| 6,386,594 | B1 | * | 5/2002 | Schuttler et al. | 285/251 |

FOREIGN PATENT DOCUMENTS

DE    3425449 A1    1/1984

* cited by examiner

*Primary Examiner*—David Bochna
(74) *Attorney, Agent, or Firm*—Watts Hoffmann Co., LPA

(57) ABSTRACT

A hose assembly including an elongated flexible metal hose attached to a hose fitting having a fitting body defining a passageway for conveying material. The fitting body has a mating portion for connecting the hose assembly to a corresponding fitting which delivers or accepts material passing through the hose assembly. A sleeve engages a surface of the fitting body and secures an end portion of the metal conduit to the fitting by trapping the end portion of the metal conduit between the sleeve and the fitting body. During installation, the sleeve is inserted into the body and subsequently the hose is inserted into a gap between the sleeve and fitting body. A fixture having a radially expanding member is slipped into the sleeve and brought into contact with the sleeve to deform the sleeve and consequently trap an end of the hose between the sleeve and the fitting.

7 Claims, 7 Drawing Sheets

FLEXIBLE METAL HOSE ASSEMBLY AND METHOD OF MAKING THE SAME

CROSS-REFERENCE TO RELATED APPLICATIONS

This non-provisional application claims benefit of U.S. Provisional Patent Application Ser. No. 60/424,865, entitled "Flexible Metal Hose Assembly and Method of Making the Same," filed on Nov. 8, 2002.

FIELD OF THE INVENTION

The present invention is directed to flexible metal hoses, and more specifically, the invention is directed to flexible metal hoses made from convoluted, corrugated metal ribbons.

BACKGROUND ART

Flexible metal hoses or conduits made from thin sheet metal ribbons which are convoluted and joined at their edges are commercially available from Hose Master Inc., assignee of the present invention. A so-called "interlocked" conduit is one example of such conduits. Interlocked conduit use thin metal ribbons wound helically with their convolutions secured together by reversely curved ribbon edges which are interlocked. The interlocked edges permit limited play between adjacent convolutions so the conduit can be flexed by a user. U.S. Pat. No. 4,197,728, issued Apr. 15, 1980, discloses conduit constructed in this manner.

Other flexible metal conduit constructions have been proposed in which flexibility is gained primarily by the manner of formation of the conduit convolutions. U.S. Pat. No. 4,486,484 issued Dec. 4, 1984, discloses such a conduit formed from convoluted metal ribbon which is corrugated. In this construction the helical corrugations provide flexibility while the joint between the convolutions is relatively inflexible. Other corrugated convoluted conduits have been proposed. U.S. Pat. No. 5,158,814 to Foti depicts another type of hose construction, hereinafter referred to as "Corrugated." The '814 patent to Foti is incorporated herein by reference.

Helically wound flexible hose is also commonly referred to as "stripwound" metal hose. There are five basic types of stripwound hose.

1) "Roughbore interlocked" is hose in which the strip is formed with legs that interlock to form a tight and rugged construction.

2) "Smoothbore interlocked" is hose made by adding another steel strip inside a roughbore hose to provide a liner having a smooth inner surface, thereby reducing damage to any sensitive materials that are placed within the hose.

3) "Packed interlocked" is hose made by adding a packing to interlocked hose to minimize leakage through the hose profile. The most effective packings are made from resilient materials such as elastomers. Other possible packing materials are stainless steel and copper.

4) "Squarelocked hose" is hose where the helical strip is formed into square shapes that are locked together. These hoses are extremely flexible and are primarily used as protective covering for wires, cables and other hoses.

5) "Corrugated" stripwound hose.

The smoothbore interlocked hose is suited for dry bulk pneumatic conveyance. This hose is produced with a durable armor and an abrasion-resistant liner to achieve a high degree of strength and flexibility.

The hose is attached to a fitting or coupler that allows the hose to be interconnected with a source or destination of the material conveyed within the hose. Selecting a proper fitting for a particular application is determined by the mating fittings to which the hose assembly, i.e., hose plus hose fitting, will be attached. Once the mating fittings have been identified, the hose fittings should complement the mating fittings in type, size and alloy. Even though the selection of hose fittings is determined by the mating fittings, it is a good practice to confirm that the fittings used in any application are appropriate for the particular environment. Any necessary changes should be made to ensure that the fittings are chemically and physically compatible with the application's environment.

Referring now to the drawings, FIGS. 1–4 depict various examples of alternative prior art connections between a hose and a fitting. These alternative connections are also depicted in a Catalog entitled "Industrial Metal Hose Products" provided by Hose Master Inc. Copyright 2001 by Hose Master Inc.

FIG. 1 shows a hose assembly having a fitting 10 attached to an interlocked hose 12 using an epoxy 14. The fitting has a notch 16 of larger diameter to accommodate the presence of the hose 12 in a region of overlap 18 between the hose and fitting.

In FIG. 2, a hose assembly includes a fitting 20 attached to an interlocked hose 22 by use of a weld or braze joint 24. If possible, the weld joint 24 is made on an interior diameter of the engagement between the hose and the fitting. As in the assembly illustrated in FIG. 1, the fitting includes a notch 26 of larger diameter that defines a region of overlap 28 between hose and fitting. Welding is not recommended, however, for packed interlocked hose, as the packing may be damaged by the relatively high welding temperature.

In FIG. 3, a hose assembly includes a fitting 30 attached to an interlocked hose 32 using two weld or braze joints 34, 35. Welding to an interior diameter provides a smooth transition between hose and fitting to prevent the product carried within the hose from becoming damaged. Providing a second weld joint 35 on the outside diameter of the fitting 30 tends to prevent contamination from entering an interface between the fitting and hose from the outside and also provides additional strength. As shown in FIGS. 2 and 3, a notch 36 of an increased inside diameter of the fitting 30 defines a region of overlap 38 between the fitting and the hose.

In FIG. 4, a hose assembly is depicted that includes two fittings 40, 41 attached to an interlocked hose 42. A first fitting 40 has a threaded interior that threadingly engages corrugations 43 in an outer diameter of the hose 42. An outer surface of the first fitting 40 is threaded to engage a threaded interior of the second fitting 41. A high temperature packing material 45 is used to seal against leakage. The second fitting 41 defines a notch 46 of slightly greater diameter against which the end of the hose 42 abuts.

DISCLOSURE OF THE INVENTION

The present invention addresses a need for an improved hose assembly that includes a hose and a fitting where an inner surface at the interface between the hose and fitting is relatively smooth. The resulting hose assembly is able to carry a product without damaging the product. Practice of the invention can be used with stripwound metal hose with or without a packing. In an embodiment that includes a packing, the hose can be pressurized. Practice of an exemplary method of fabricating a hose assembly provides a strong coupling between the hose and a fitting.

One exemplary embodiment of a hose assembly constructed in accordance with the invention includes an elongated flexible metal hose attached to a hose fitting having a fitting body defining a passageway for conveying material. The fitting body has a mating portion for connecting the hose assembly to a corresponding fitting which delivers or accepts material passing through the hose assembly. The fitting defines a gap which extends into the fitting body at one end. An end portion of the metal conduit is inserted into the gap and connected to the fitting by deforming the fitting in the region of the gap thereby trapping the end portion of the metal conduit between the inner surfaces of the gap within the fitting body.

In one configuration, the fitting body has an inner surface sized to accept a sleeve which in combination forms the gap. An end of the flexible metal hose is trapped between this inner surface of the fitting body and an outer surface of the sleeve. During fabrication of the hose assembly, the sleeve is inserted into the fitting body. Subsequently, the hose is inserted into a gap between the sleeve and fitting body. With the hose in place, a fixture is moved into the sleeve from an end of the fitting. The fixture includes a moveable member that moves outwardly into contact with an inner diameter of the sleeve. As the member expands outwardly, it bends or deforms the sleeve outwardly to trap the hose between the sleeve and the fitting.

In one embodiment of the invention, the hose assembly can be pressurized due to the presence of a packing material within the hose. In this pressurized version of the hose assembly, the interface between fitting and the sleeve forms a gap that contains a sealant. In one embodiment, the sealant is a silicone packing material referred to as RTV. In an alternate embodiment, an alternate hose assembly can be constructed using a hose that does not contain a packing.

Regardless of what type of hose that is used, i.e., with or without packing, the interface between hose and fitting is generally smooth so that materials conveyed by the assembly are not damaged. No welding is performed during the fabrication of the hose assembly. Excluding any welding step advantageously avoids damaging any packing material contained within the hose portion of the hose assembly.

These and other objects, advantages and features of the invention will become better understood from a review of the following detailed depiction of an exemplary embodiment of the invention.

EXEMPLARY EMBODIMENT FOR PRACTICING THE INVENTION

Figure 1:
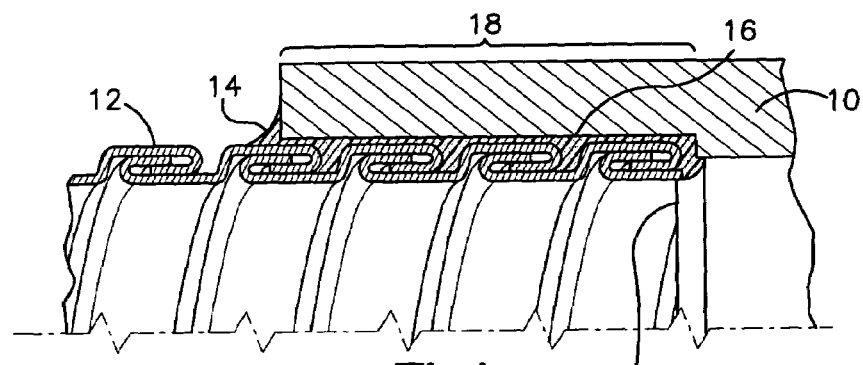
FIGS. 1–4 each depict a prior art technique for attaching a flexible metal hose to a fitting.
Figure 2:
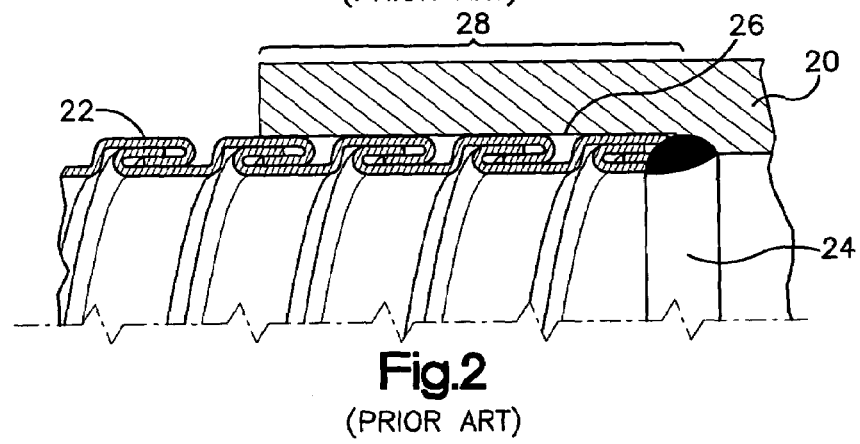
Figure 3:
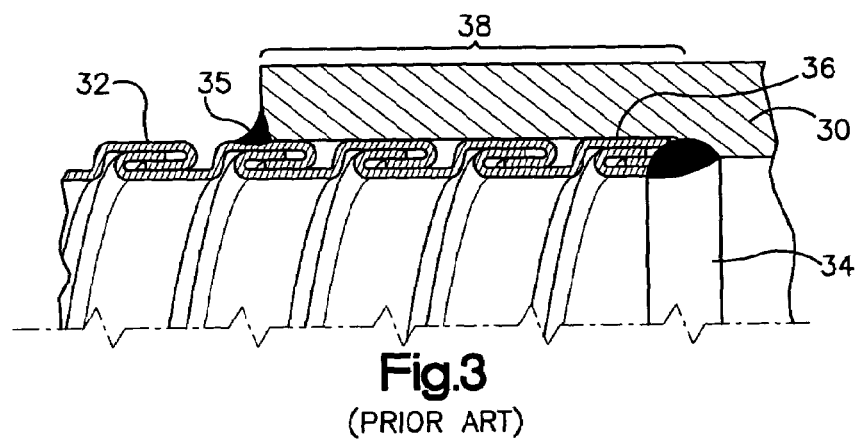
Figure 4:
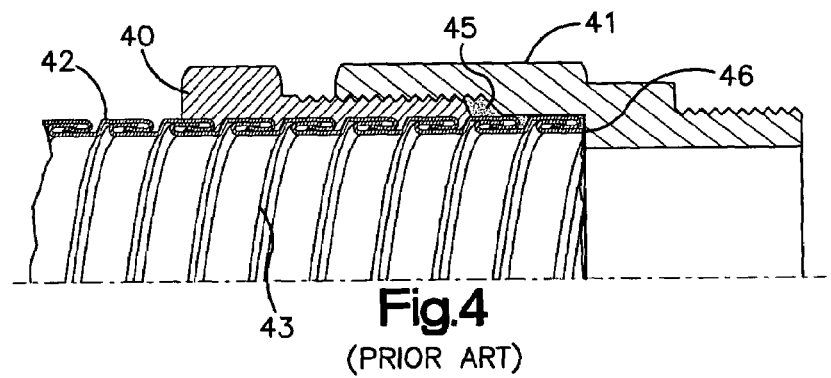
Figure 5:
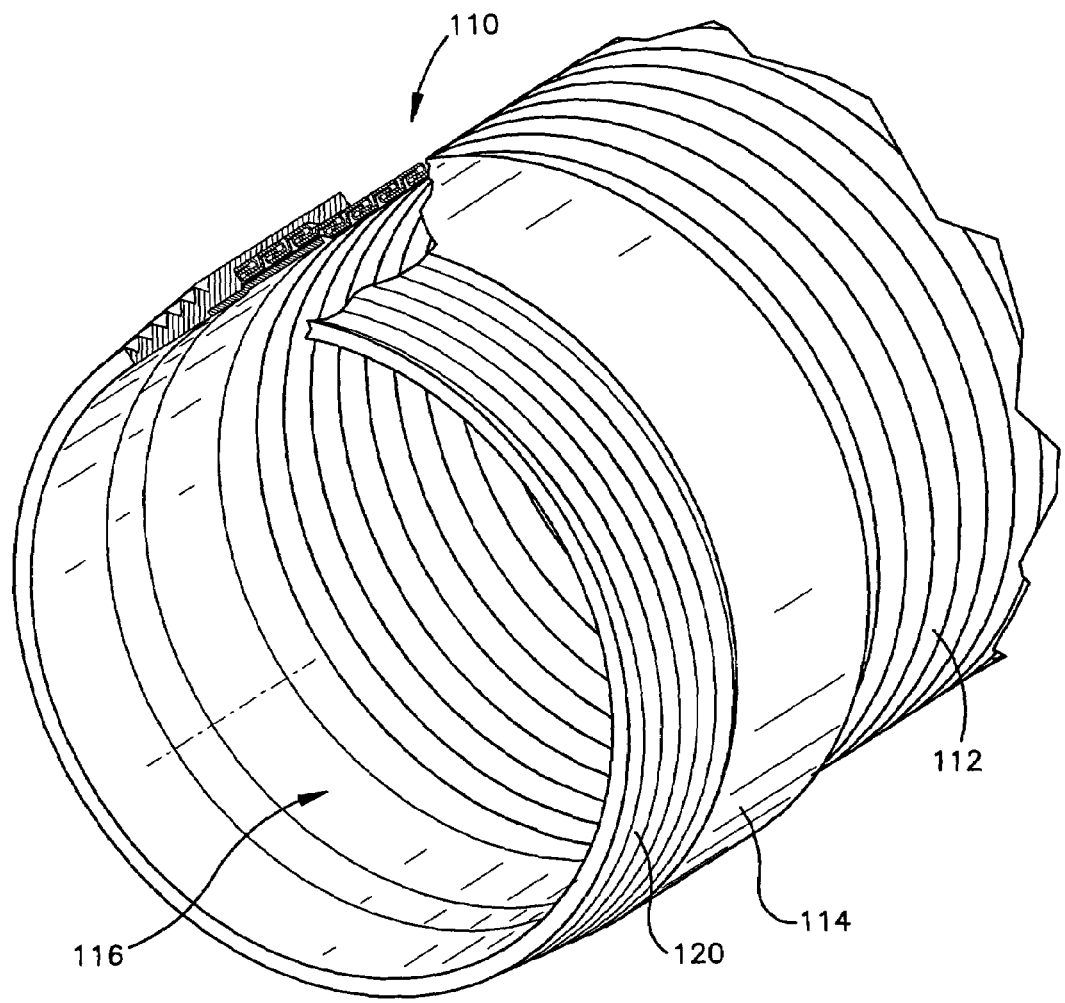
FIG. 5 is a perspective view of a hose assembly constructed in accordance with the present invention.

Turning now to FIGS. 5–8, a hose assembly 110 constructed in accordance with one exemplary embodiment of the invention is depicted. The hose assembly 110 includes an elongated flexible metal hose 112 attached to a hose fitting 114 having a fitting body defining a passageway 116 for conveying material. The fitting body has a mating portion 120 for connecting the hose assembly 1 10 to a corresponding fitting (not shown) which delivers or accepts material passing through the hose assembly 110. A sleeve 122 (see FIG. 6) frictionally engages an inner surface of the fitting body and secures an end portion 130 (see FIG. 7) of the metal conduit or hose 112 to the fitting by trapping the end portion 130 of the metal conduit or hose between the sleeve 122 and the fitting body.

In the disclosed hose assembly, an inner surface of the fitting has a stepped recess 132 (see FIG. 6) that is machined into the fitting body. A first portion of the stepped recess 132 has a cylindrical surface 134 sized to accommodate insertion of the sleeve 122. The sleeve is a metal cylinder having first and second portions 136, 137 of different diameter coupled by a tapered or transition portion 138. The outer diameter of the sleeve 122 along the larger diameter portion 136 is sized slightly smaller than the inside diameter of the surface 134 in the stepped recess region of the fitting body. The thickness of the sleeve 122 is chosen to provide a smooth interface between an inner surface 139 of the fitting body and the sleeve 122 in the region of the surface 134.

A difference in diameter between the adjacent surfaces 139, 134 in the fitting body defines a lip against which one end of the sleeve 122 abuts as it is inserted into the fitting body. During fabrication of the hose assembly 110, the sleeve 122 is inserted into the fitting body until it abuts against the lip between the two fitting surfaces 134, 139. The sleeve remains fixed to the fitting by means of the frictional engagement between the fitting along the surface 134 and along an outer surface of the sleeve portion 136.

Figure 6:
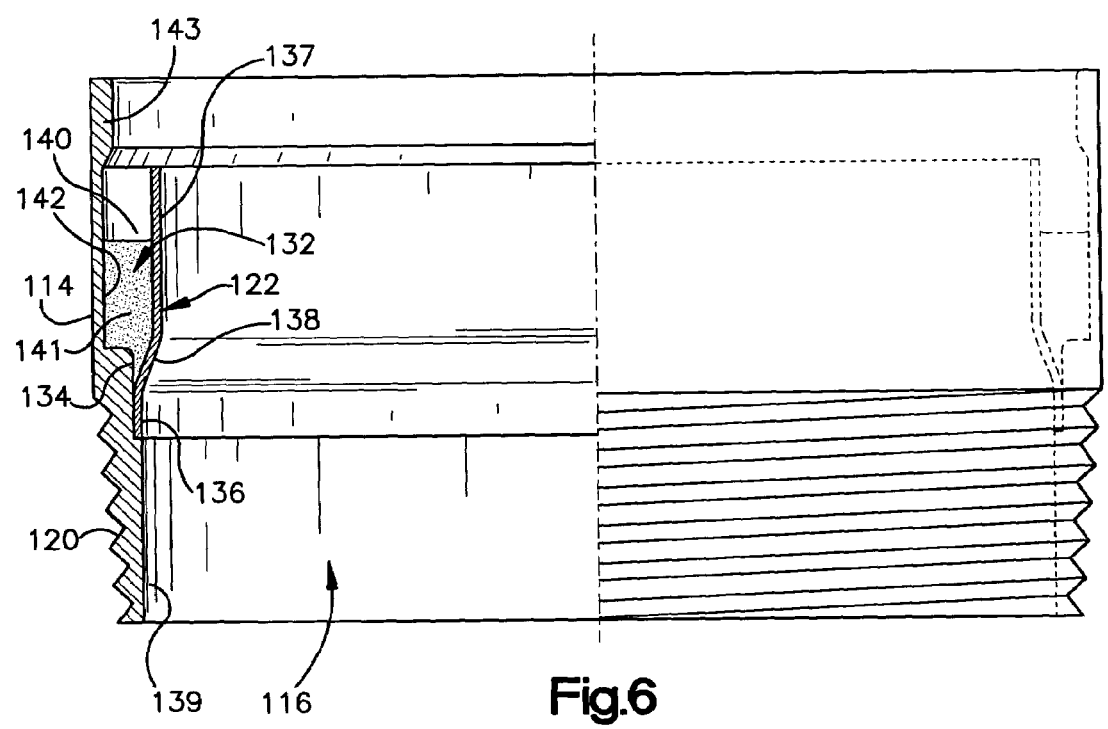
FIG. 6 is a partially sectioned view of a fitting used in accordance with one exemplary embodiment of the invention.
Figure 7:
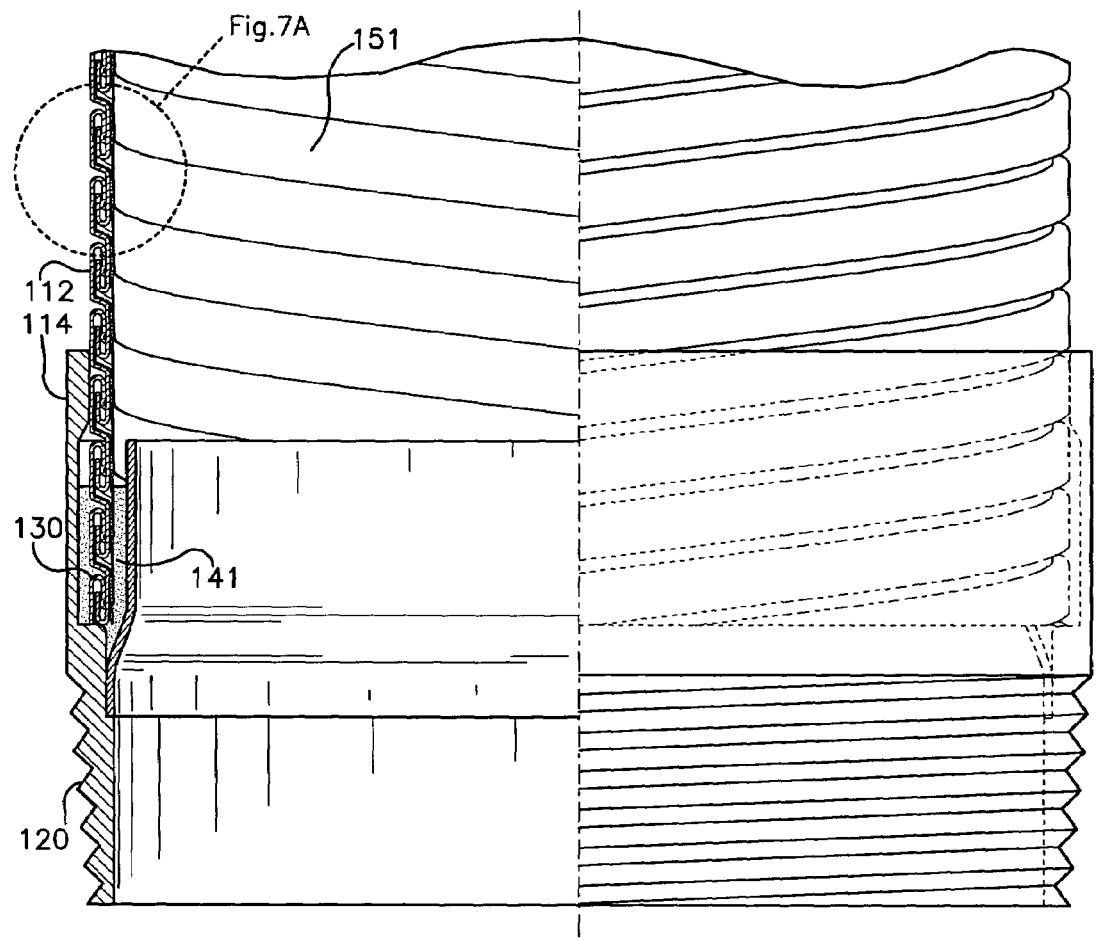
FIG. 7 is a partially sectioned view of a hose and fitting, showing the hose inserted into the fitting depicted in FIG. 6.
Figure 7A:
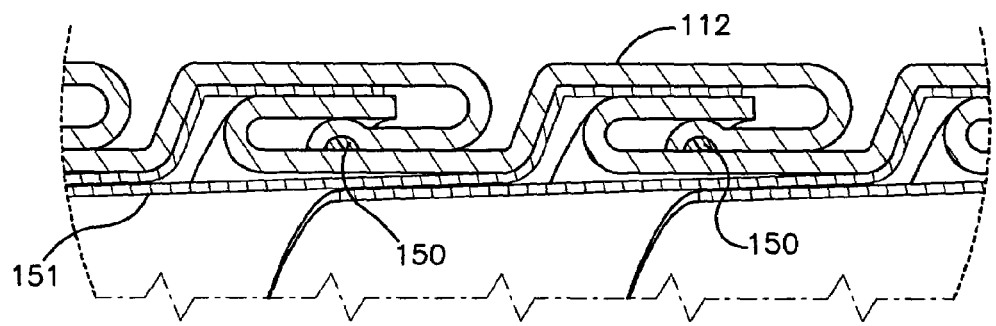
FIG. 7A is an enlarged view of the smoothbore, packed, interlocked hose of FIG. 7 having an inner liner that presents a smooth hose interior.
Figure 8:
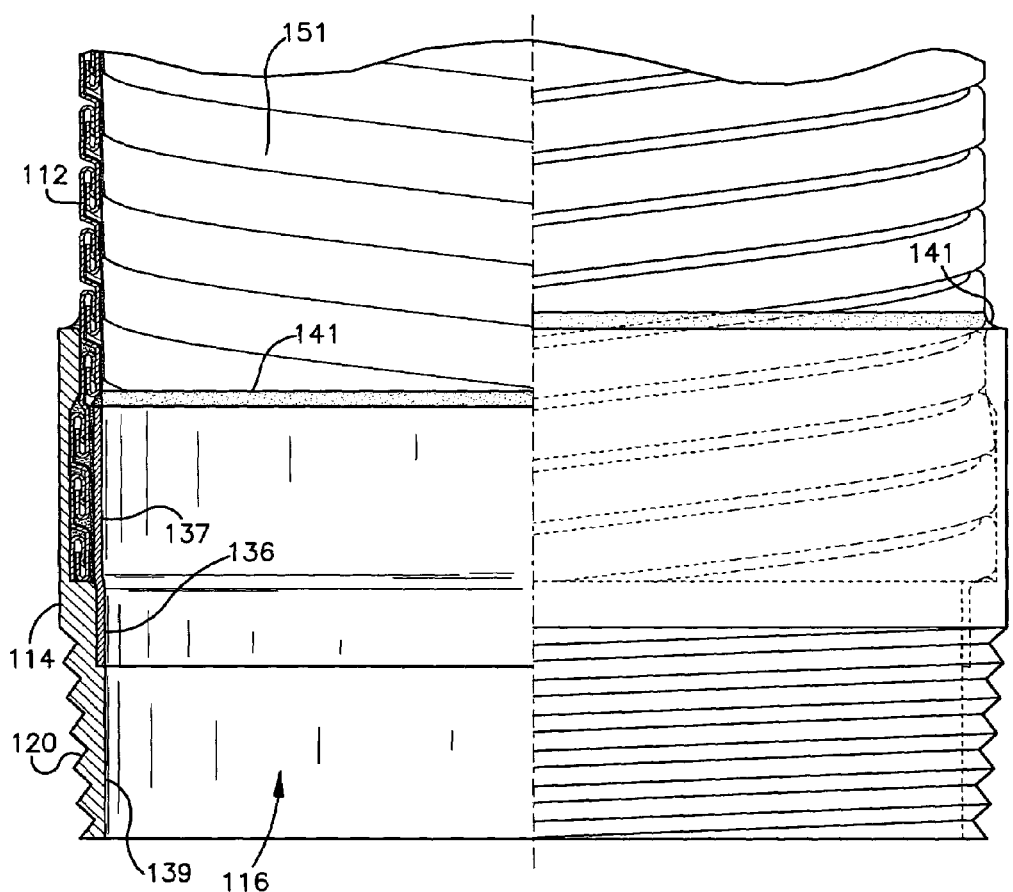
FIG. 8 is a partially sectioned view of a completed hose assembly constructed in accordance with the present invention.

FIG. 6 shows the hose 112 after it has been inserted into a gap 140 between the sleeve and fitting body. The gap is defined by a second larger diameter cylindrical portion 142 of the notched or stepped recess 142 of the fitting body and a reduced diameter portion 137 of the sleeve 122. As illustrated in Figures, the cylindrical portion 142 flares outwardly at one end to a thicker end portion 143 at the fitting end. One suitable hose 112 for practice of this exemplary embodiment of the invention is depicted in greater detail in FIG. 7A. This hose 112 includes a packing material 150 that advantageously allows the hose to be pressurized. In an embodiment suitable to carry material under pressure, the gap 140 is partially filled with a viscous sealing material 141. One suitable sealing material is known under the designation RTV and is a family of silicone based sealants. After the hose 112 has been inserted into the gap 140, the sleeve is deformed against the hose 112. A special fixture having a cylindrical member or expander (not shown) that moves radially outwardly is inserted into the fitting in juxtaposition with the sleeve portion 137. This cylindrical member expands outwardly into contact with an inner surface 144 of the sleeve portion 137. Continued movement of this cylindrical member bends the sleeve portion 137 outwardly thereby trapping the hose between the sleeve and the fitting as depicted in FIG. 8. As the sleeve 122 presses against the end of the hose 112 the sealant 141 is forced out of the gap and forms a bead around the interface between the sleeve 122 and a liner 151 of the hose. To enhance the uniformity of the interface between the hose and the fitting, the sealant 151 is treated by wiping excess sealant away from this interface.

Figure 7B:
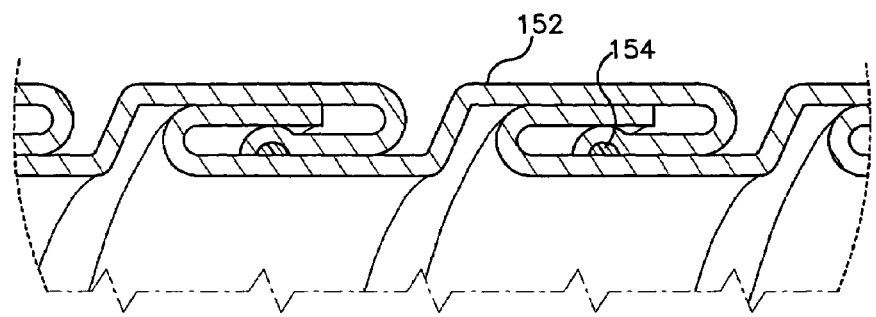
FIG. 7B is an enlarged section view of a roughbore, packed, interlocked hose without an inner liner.

The invention can be used with any form of stripwound hose. The hose 112 depicted in greater detail in FIG. 7A is smoothbore interlocked style hose with a packing bead 150 and includes an elongated helically wrapped inner lining 151 of thin sheet metal. A similar hose assembly, however, could be fabricated using roughbore interlocked, i.e., without lining, such as the hose 152 depicted in FIG. 7B having a packing 154 bead or rope. A presently preferred sleeve 122 is constructed from 300 series stainless steel.

ALTERNATIVE EMBODIMENT

Turning now to FIGS. 9, 9A, 9B and 10, an alternative embodiment of a hose assembly 210 constructed in accordance with one exemplary embodiment of the invention is depicted. The hose assembly 210 includes an elongated flexible metal hose 212 attached to a hose fitting 214 having a fitting body defining a passageway 216 for conveying material. The fitting body has a mating portion 220 for connecting the hose assembly 210 to a corresponding fitting (not shown) which delivers or accepts material passing through the hose assembly 210. A sleeve 222 frictionally engages an inner surface of the fitting body and secures an end portion 230 of the metal conduit or hose 212 to the fitting by trapping the end portion 230 of the metal conduit or hose between the sleeve 222 and the fitting body.

This alternate embodiment of the invention is used with roughbore interlocked or smoothbore interlocked hose with no packing. Representative depictions of two such hoses 212, 252 are depicted in FIGS. 9A and 9B. The hose 212 depicted in greater detail in FIG. 9A is smoothbore interlocked without any packing bead but does include an elongated helically wrapped inner lining 251 of thin sheet metal. A similar hose assembly is fabricated using roughbore interlocked, i.e., without lining, such as the hose 252 depicted in FIG. 9B.

Figure 9:
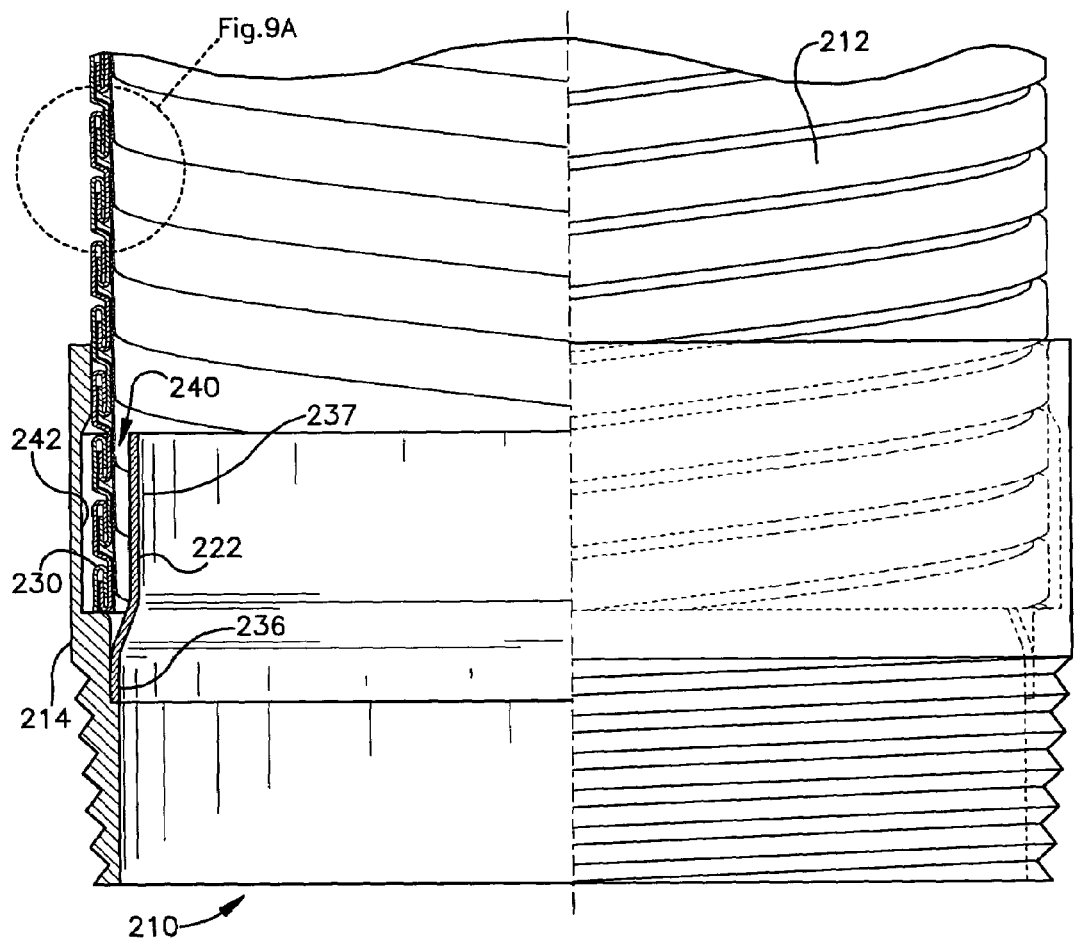
FIG. 9 is an alternate embodiment for use with a hose without a packing material and that is fabricated without a sealant at the interface between the hose and the fitting.
Figure 9A:
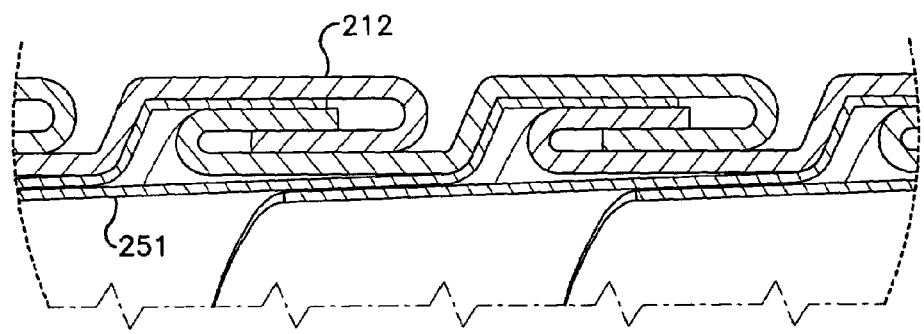
FIG. 9A is an enlarged view of a smoothbore, interlocked hose without packing.
Figure 9B:
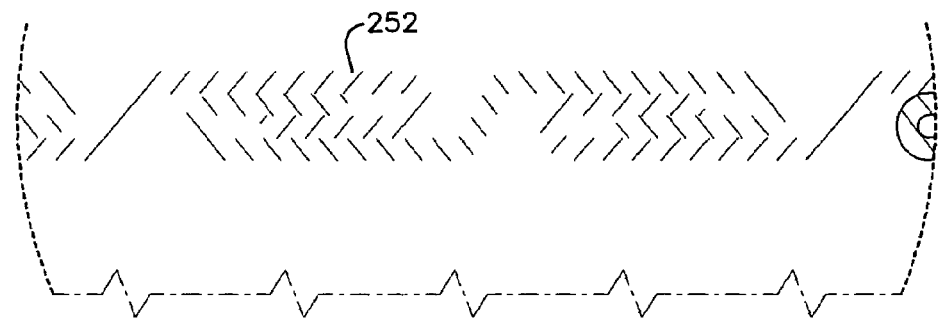
FIG. 9B is an enlarged view of a roughbore, interlocked hose without packing.
Figure 10:
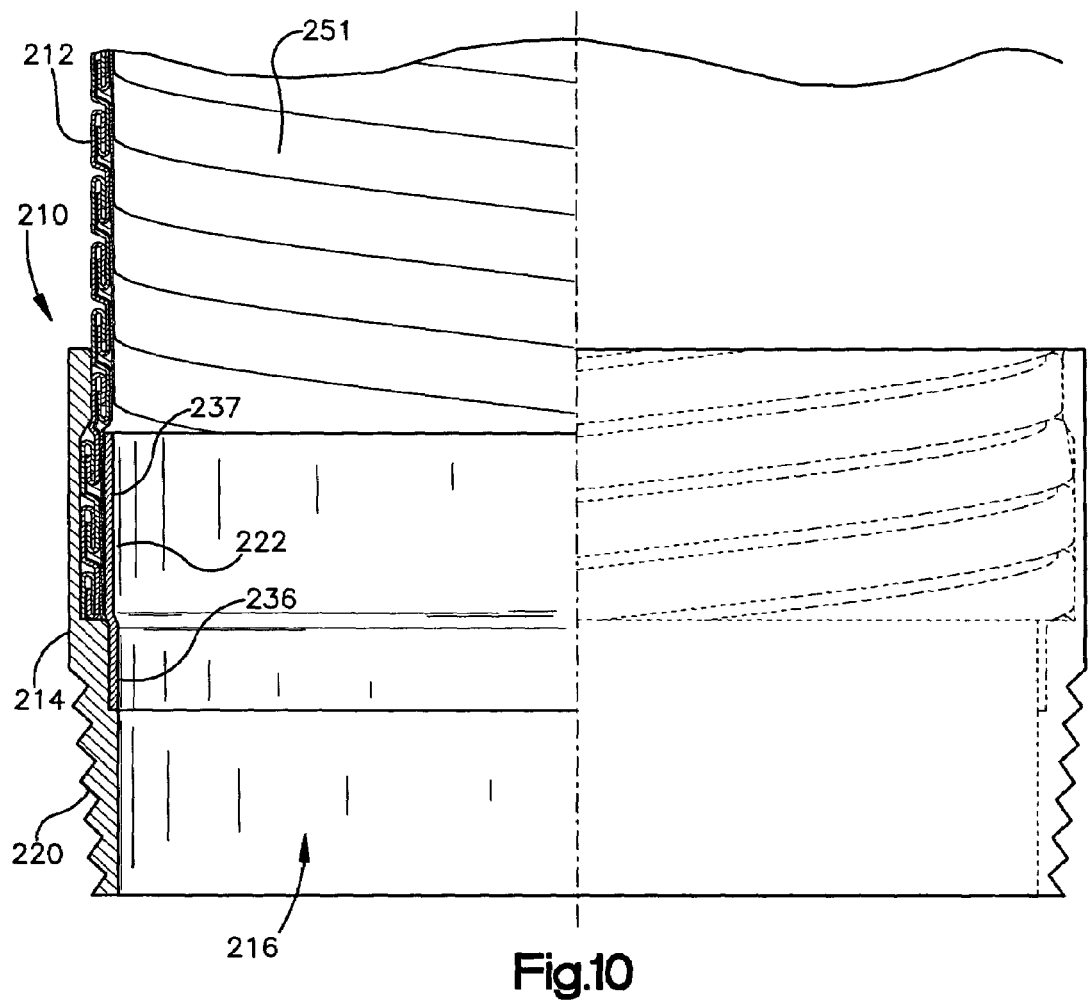
FIG. 10 is a depiction of a completed hose assembly without sealant between the hose and the fitting and no packing within the hose.

FIG. 9 shows the hose 212 after it has been inserted into a gap 240 between the sleeve and fitting body. In this assembly, no sealant has been added to this gap because the assembly depicted in FIGS. 9 and 10 is not intended to be pressurized. The gap is defined by a larger diameter portion 242 of the notched region of the body fitting and a reduced diameter portion 237 of the sleeve 222. A special fixture having a cylindrical member that moves outwardly is fit into the sleeve and expanded outwardly into contact with an inner surface of the sleeve portion 237. Continued movement of this fixture member bends the sleeve portion 237 outwardly thereby trapping the hose between the sleeve and the fitting as depicted in FIG. 10.

It is appreciated that although the invention has been described with a degree of particularity, it is the intent that the invention include all modifications and alterations from the disclosed embodiments falling within the spirit or scope of the appended claims.

What is claimed is:

1. A hose assembly comprising:
   a) a thin metal ribbon arranged in a helix that is wound about a central axis, said ribbon including convolutions formed in adjacent edges of the ribbon which engage each other to form a closed wall flexible metal hose; and
   b) a hose fitting, said hose fitting comprising:
      i) a fitting body defining a throughpassage for material conveyed by the hose assembly having an inner fitting surface that contacts an outer hose surface of said flexible metal hose, wherein the inner fitting surface includes an annular notch and an outer fitting surface including a mating portion for connecting the hose assembly to a corresponding fitting which delivers or accepts material passing through the hose assembly; and
      ii) a sleeve which engages by contact a surface of the fitting body and an inner hose surface of said flexible metal hose to thereby secure an end portion of the metal hose to the fitting body by trapping the end portion of the metal conduit between said sleeve and the fitting body such that the end portion of the metal hose that contacts said sleeve is displaced by said sleeve outward radially and received into said annular notch to effectuate a connection between said metal hose and said fitting body, and wherein said notch is a stepped notch and wherein one portion of the notch defines an abutting surface and wherein said sleeve has one end that contacts said abutting surface as it is inserted into an interior of the fitting.

2. The hose assembly of claim 1 wherein said notch defines a second portion that extends further into the fitting body to accommodate both the sleeve and the flexible metal hose.

3. A hose fitting comprising:
   a) a fitting body defining a throughpassage for material conveyed by the hose fitting and including an annular notch in said throughpassage, said fitting body having a mating portion for connecting the hose fitting to a corresponding source or destination fitting which delivers or accepts material passing through the hose fitting;
   b) a sleeve which engages a surface of the fitting body for securing an end portion of a metal hose to the fitting body by contacting and trapping the end portion of said metal hose within said annular notch between said sleeve and said fitting body, and wherein said notch is a stepped notch and wherein one portion of the notch defines an abutting surface and wherein said sleeve has one end that contacts said abutting surface of the fitting body.

4. The hose fitting of claim 3 wherein said notch defines a second portion that extends further into the fitting body to accommodate both the sleeve and an end of a flexible metal hose.

5. A method of fabricating a hose assembly comprising:
   a) providing a hose fitting body defining a throughpassage for material conveyed by the hose assembly having a mating portion for connecting the hose assembly to a corresponding fitting which delivers or accepts material passing through the hose assembly, wherein the fitting body includes an annular notch;

b) forming a gap with a sleeve that extends into an interior of the fitting body from one end of the fitting body;

c) inserting one end of a closed wall metal hose into the gap of the fitting body and the sleeve such that an outer surface of the metal hose engages by contact an inner surface of the fitting body and an inner surface of the metal hose engages by contact an outer surface of the sleeve; and d) deforming the sleeve such that the end of the metal hose within the gap is deformed outward radially and received in the annular notch and is thereby trapped between the inner surface of the fitting body and an outer surface of the sleeve and both the fitting body and the sleeve contact the metal hose to attach an end of the hose to the fitting body.

6. The method of claim 5 wherein said step of forming the gap is performed by bringing a sleeve into engagement with a generally cylindrical inner surface of the fitting body.

7. The process of claim 5 wherein a sealant is added to the gap prior to inserting said one end of a closed wall metal hose.

* * * * *